(12) United States Patent
Nwankwoala et al.

(10) Patent No.: US 12,209,184 B2
(45) Date of Patent: Jan. 28, 2025

(54) ASPHALT ADDITIVES

(71) Applicant: Ascend Performance Materials Operations LLC, Houston, TX (US)

(72) Inventors: Chinenyeze Nwankwoala, Houston, TX (US); Zheng Chai, Houston, TX (US); Jefferson Thomas Ebert, Decatur, AL (US); David W. McNeece, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 638 days.

(21) Appl. No.: 17/479,367

(22) Filed: Sep. 20, 2021

(65) Prior Publication Data
US 2022/0112129 A1   Apr. 14, 2022

Related U.S. Application Data (60) Provisional application No. 63/089,831, filed on Oct. 9, 2020.

(51) Int. Cl.
*C08L 95/00* (2006.01)
*C08K 5/17* (2006.01)

(52) U.S. Cl.
CPC .............. *C08L 95/00* (2013.01); *C08K 5/17* (2013.01); *C08L 2555/60* (2013.01)

(58) Field of Classification Search
None
See application file for complete search history.

(56) References Cited

U.S. PATENT DOCUMENTS

| | | | | |
|---|---|---|---|---|
| 3,217,028 A | * | 11/1965 | Vertnik | C08G 73/02 564/511 |
| 3,281,470 A | * | 10/1966 | Vertnik | C08G 73/0206 127/29 |
| 4,430,127 A | * | 2/1984 | Dalter | C08K 5/17 106/284.4 |
| 4,906,783 A | | 3/1990 | Smiley | |
| 5,112,396 A | * | 5/1992 | Hegarty | B27K 3/50 106/18.32 |

FOREIGN PATENT DOCUMENTS

| | | |
|---|---|---|
| CN | 106905476 A | 6/2017 |
| CN | 110 438 524 A | 11/2019 |
| KR | 10-1863295 B1 | 5/2018 |

OTHER PUBLICATIONS

Office Action for Canadian Patent Application No. 3, 148,929 dated Sep. 8, 2022, 5 pages.

* cited by examiner

*Primary Examiner* — Alexandra M Moore
(74) *Attorney, Agent, or Firm* — COZEN O'CONNOR (57) ABSTRACT

Provided herein are antistripping compositions which may be used, for example, as additives to bitumen compositions such as asphalt concrete to prevent or reduce susceptibility to water damage. In particular, the antistripping compositions of the present disclosure have a triamine component and a nitrile component. Also provided herein are bitumen compositions, such as asphalt, having a portion of the described antistripping compositions as an additive.

30 Claims, 3 Drawing Sheets

ASPHALT ADDITIVES

CROSS-REFERENCE

This application is related to and claims priority to U.S. Provisional Patent Application No. 63/089,831 filed Oct. 9, 2020, which is incorporated herein by reference.

FIELD

The present disclosure relates generally to additives for bitumen compositions, such as asphalt compositions, e.g., asphalt concrete. In particular, the present disclosure relates to antistripping compositions, which may be used as additives for bitumen compositions. The present disclosure also relates generally to bitumen compositions having an antistripping additive added thereto.

BACKGROUND

Bituminous aggregate mixtures are commonly used for paving materials and other construction material. For example, these mixtures are typically used to pave roadways, driveways, parking lots, and the like. Typically, the bituminous aggregate mixture comprises a mixture of aggregate materials, stones, gravel, sand or other mineral aggregates, bound by a bituminous binder, such as asphalt. The mixing of the aggregate material with the bituminous binder is accomplished in any of several known methods. For some mixtures, referred to in the art as hot-mix asphalt concrete (HMA), the aggregate material is heated at an elevated temperature from about 130° C. to 190° C. and mixed with the bituminous binder. The bituminous aggregate mixture is then applied to a surface and compacted at an elevated temperature. For other mixtures, referred to in the art as warm-mix asphalt concrete (WMA), the bituminous binder is mixed with an additional "soft" component, such as a zeolite or wax, which is melted and mixed with aggregate at about 40-125° C. For still other mixtures, referred to in the art as cold-mix asphalt concrete, a cold aggregate material is mixed with a hot or cold binder, which may be an emulsion of asphalt in water, e.g., using a suitable surfactant, or a mixture of asphalt and a suitable hydrocarbon solvent. The emulsified asphalt particles coat and bind with the aggregate and remain after the water has evaporated.

Across all types bituminous aggregate mixtures, failure of the bituminous binder to adhere to the aggregate may result in separation, or "stripping," of the binder from the aggregate. Typically, stripping is the result of water disrupting the bond between the bituminous binder and aggregate mixture and replacing the bituminous binder as the coating surrounding the aggregate. Stripping is often promoted by inclement weather and/or exposure of the compacted bituminous aggregate mixture to water. During the winter months, for example, low temperatures tend to stiffen and reduce the flexibility of the asphalt binder in the paving material. Under these conditions (and with traffic loadings), the compacted mixture tends to crack, allowing surface water to seep into the pavement. As the water goes through freeze-thaw cycles, it strips the bituminous binder, e.g., asphalt, from the aggregate mixture, reducing the strength of the compacted mixture and accelerating deterioration. In addition, during the summer months, high temperatures can cause the asphalt pavement to become so soft that traffic can permanently deform the material creating shoving, rutting, bleeding and flushing problems.

To aid adherence of the binder to the aggregate, the aggregate mixture and/or the bituminous binder may be treated with an antistripping additive. Conventional antistripping additives reduce stripping by acting as a binding agent between the aggregate granules and bituminous binder. Examples of commonly used antistripping additives include surfactants and ethyleneamines, which are added to the aggregate mixture and/or bituminous binder, e.g., when heated. Conventional antistripping additives are undesirable, however, as they provide inadequate protection from water as tested by any of numerous moisture susceptibility test procedures, e.g., ASTM D 3625 (boiling water test), AASHTO T 283 (modified Lottman test), AASHTO T 324 (Hamburg wheel tracking test), ASTM D 4867 (Tunnicliff and Root conditioning test), AASHTO T 182 (static-immersion test), and AASHTO T 165 (immersion-compression test). In addition, conventional antistripping additives are not effective for all types of bituminous aggregate mixtures, e.g., for HMA, WMA, and cold-mix asphalt concrete. For example, some conventional antistripping additives are not thermally stable and therefore are not suitable for HMA.

Accordingly, there is a need for improved antistripping compositions that improve the moisture resistance and/or thermal stability of bituminous aggregate mixtures, e.g., asphalt.

SUMMARY

In one aspect, the present disclosure describes an antistripping composition, comprising a triamine component preferably present in an amount ranging from 1 wt % to 40 wt %.; and a nitrile component, preferably present in an amount ranging from 60 wt % to 99 wt %. In some cases, the nitrile component has a chemical formula $C_xH_{2x-1}(CN)_3$, wherein x is from 4 to 10. In some cases, the nitrile component comprises tricyanohexane. In some cases, the nitrile component comprises a trinitrile compound having a chemical structure:

wherein a, b, and c are independently from 0 to 4. In some cases, the nitrile component comprises adiponitrile. In some cases, the triamine component comprises a triamine compound having a chemical structure:

wherein x and y are independently from 1 to 10, and wherein R is hydrogen, a $C_1$-$C_5$ alkyl group, a $C_2$-$C_5$ alkenyl group, or a $C_1$-$C_5$ alcohol group. In some cases, the triamine component comprise a triamine compound comprising BHMT, an ethyleneamine, or an amidoamine, or combinations thereof. In some cases, the antistripping composition further comprises an organic additive. In some cases, the organic additive comprises a vegetable oil or in some cases wherein the organic additive comprises ethanol, propanol, or an alkylene glycol, or corresponding esters of thereof, or combinations thereof. In some cases, the vegetable oil is selected from the group consisting of canola oil, castor oil, coconut oil, corn oil, cottonseed oil, distilled tall oil, flax seed oil, jetropa oil, linseed oil, mustard oil, olive oil, palm oil, peanut oil, rapeseed oil, safflower oil, sesame oil, sunflower oil, soybean oil, soy oil, castor oil, tung oil, tigernut oil, and combinations thereof. In some cases, the organic additive comprises an ester having a chemical structure:

wherein a and b are independently from 0 to 4. In some cases, the antistripping composition has an amine value from 5 mg KOH/g to 20 mg KOH/g. In some cases, the antistripping composition comprises from 60 wt. % to 80 wt. % of the triamine component and from 1 wt. % to 40 wt. % of the nitrile component. In some cases, the antistripping composition comprises less than 100 ppm water.

In another aspect, the present disclosure describes a bitumen composition, comprising a bituminous material and the antistripping composition described herein. In some cases, the bitumen composition comprises from 0.05 wt. % to 2 wt. % of the antistripping composition. In some cases, the bitumen composition comprises an asphalt. In some cases, the asphalt is performance-grade asphalt. In some cases, the bitumen composition exhibits at least 60% coating retention, measured according to ASTM D 3625 (2020). In some cases, the bitumen composition exhibits a tensile strength ratio greater than 80, measured according to AASHTO T 283 (2020). In some cases, the bitumen composition exhibits a Hamburg wheel track testing rut depth of less than 10 mm, measured according to AASHTO T 324 (2020). An antistripping composition, comprising: less than 95% of a triamine component and greater than 5% nitrogen-containing compound other than the triamine component (and optionally water) is disclosed, as is a process for improving durability in a bitumen composition comprising a bituminous material. The process comprises adding the antistripping composition of any of the above claims to the bitumen composition to form a treated bitumen composition, wherein, upon aging for 40 days, the treated bitumen composition demonstrates a BBR stiffness less than 247 MPa, as measured in accordance with AASHTO T313 (2020).

DETAILED DESCRIPTION

Introduction

As noted above, it has been well-established that the exposure of a traditional bituminous aggregate mixture, such as asphalt concrete, to moisture deteriorates paved and compacted surfaces formed from the mixture. This is because water and/or water vapor may cause the separation of the bituminous binder, e.g., asphalt, from the aggregate, a phenomenon known in the art as "stripping." Stripping then contributes to various distress mechanisms that lead to the deterioration and ultimate failure of the bituminous aggregate mixture, such as rutting, fatigue cracking, and thermal cracking.

The present disclosure relates to compositions and methods for reducing or mitigating stripping of bituminous aggregate mixtures, such as asphalt concrete (anti stripping compositions). In particular, the present disclosure describes antistripping compositions, comprising a triamine component and, in some cases, an additional component, e.g., a nitrile component and/or an organic additive and/or a synergistic nitrogen-containing compound, which inter alia reduce or eliminate the susceptibility of a bituminous aggregate mixture to moisture. Furthermore, the present disclosure describes bitumen compositions that comprise the antistripping compositions and that demonstrate improved performance characteristics as a result of the addition of the antistripping compositions. The present inventors have found that the antistripping compositions described herein, as well as the bitumen compositions comprising the antistripping compositions, exhibit improved resistance to the negative effects of moisture as measured by a variety of performance metrics.

Furthermore, as described below, some embodiments of the antistripping compositions described herein beneficially form stable solutions that remain liquid, e.g., at or below room temperature. As a result, the antistripping compositions described herein exhibit improved thermal stability.

Without being bound by theory, it is believed that the structure of the components within the antistripping composition prevent water from replacing the bituminous binder as the coating surrounding the aggregate in a bituminous aggregate mixture. As detailed further below, the components include are organic compounds containing one or more amine and/or (optionally) nitrile moieties. In theory, the organic portion is soluble in the bituminous binder, e.g., asphalt, and is anchored therein, whereas amine and/or nitrile moieties have an affinity for the aggregates. As a result, the antistripping compositions may secure the bond between in the bitumen binder and the aggregate, preventing water from separating the bituminous binder from the aggregate. In particular, as one example, the combination of amine moieties along with the nitrile moieties has been found to be particularly effective because the nitrile moieties have both strong electronegativity and branched chemical structure. And the electronegativity and the structure synergistically work in conjunction with the triamine and the aggregate to improve bond strength that the triamine has with the electropositive charge centers on the surface of the aggregate. Stated another way, the nitrile moieties unexpectedly improve the bonding between the triamine and the aggregate due at least in part to the strong electronegativity and branched chemical structure of the nitrile.

Triamine Component

Described herein are a number of triamine compounds, which the present inventors have found favorably prevent, reduce, or eliminate the stripping of bitumen compositions, e.g., bituminous aggregate mixtures, such as asphalt concrete, and/or provide for the improved thermal stability of the bitumen compositions. As such, the triamine compounds are useful as components of antistripping compositions. Thus, the antistripping compositions described herein comprise a triamine component of one or more triamine compounds.

The triamine component comprises a triamine compound, e.g., an organic compound having three amino, or nitrogen, functional groups on a saturated or unsaturated chain of carbon atoms. The triamine compound may vary widely, but generally, it will have the aforementioned amino or nitrogen functionality. For example, in some embodiments, the triamine compounds comprises an alkane triamine, e.g., an organic compound having the chemical formula $C_xH_{2x+5}N_3$, wherein x is from 6 to 20. Exemplary alkane triamines include hexane triamine, heptane triamine, octane triamine, nonane triamine, decane triamine, undecane triamine, dodecane triamine, tridecane triamine, pentadecane triamine, hexadecane triamine, heptadecane triamine, octadecane triamine, nonadecane triamine, and icosane triamine.

In some embodiments, the triamine compound comprises an alkene triamine, e.g., an unsaturated organic compound having the chemical formula $C_xH_{2x+3}N_3$, wherein x is from 6 to 20. Exemplary alkene triamines include hexene triamine, heptene triamine, octene triamine, nonene triamine, decene triamine, undecene triamine, dodecene triamine, tridecene triamine, pentadecene triamine, hexadecene triamine, heptadecene triamine, octadecene triamine, nonadecene triamine, and icosene triamine.

It has been found that the presence of the triple amine moieties provides unexpected improvements in securing the bond between the bitumen binder and the aggregate versus other amines containing fewer amino functional groups. These amino groups work in conjunction with the cyano functionality of the trinitriles (see additional discussion herein).

In some embodiments, the triamine compound comprises an aryl triamine, e.g., an aromatic organic compound having three amino, or nitrogen, functional groups.

In some embodiments, the triamine component comprises a triamine compound having a chemical structure:

wherein x and y are independently from 1 to 10, and wherein R is hydrogen, a $C_1$-$C_5$ alkyl group, a $C_2$-$C_5$ alkenyl group, or a $C_1$-$C_5$ alcohol group. In some embodiments, R is hydrogen.

In some cases, the triamine compound may be, for example, di(4-amino-butyl)amine, di(5-amino-pentyl)amine, di(6-amino-hexyl)amine, e.g., bis(hexamethylene (triamine)), di(7-amino-heptyl)amine, di(8-amino-octyl)amine, (4-amino-butyl)(5-amino-pentyl)amine, (4-amino-butyl)(6-amino-hexyl)amine, bis(hexamethylene)triamine (BHMT), (4-amino-butyl)(7-amino-heptyl)amine, (4-amino-butyl)(8-amino-octyl)amine, (5-amino-pentyl)(6-amino-hexyl)amine, (5-amino-pentyl)(7-amino-heptyl)amine, or (5-amino-pentyl)(8-amino-octyl)amine.

In some cases, the triamine compound comprises BHMT, ethyleneamines, or amidoamines, or combinations thereof.

In some embodiments, the triamine component comprises a triamine compound, in an amount ranging from 40 wt. % to 90 wt. %, based on the total weight of the triamine component, e.g., from 40 wt. % to 85 wt. %, from 40 wt. %, to 80 wt. %, from 40 wt. % to 75 wt. %, from 45 wt. % to 90 wt. %, from 45 wt. % to 85 wt. %, from 45 wt. %, to 80 wt. %, from 45 wt. % to 75 wt. %, from 50 wt. % to 90 wt. %, from 50 wt. % to 85 wt. %, from 50 wt. %, to 80 wt. %, from 50 wt. % to 75 wt. %, from 55 wt. % to 90 wt. %, from 55 wt. % to 85 wt. %, from 55 wt. %, to 80 wt. %, or from 55 wt. % to 75 wt. %. In terms of upper limits, the triamine component may comprise less than 90 wt. % of the triamine compound, e.g., less than 85 wt. %., less than 80 wt. %, or less than 75 wt. %. In terms of lower limits, the triamine component may comprise greater than 40 wt. % of the triamine compound, e.g., greater than 45 wt. %, greater than 50 wt. %, or greater than 55 wt. %.

In some embodiments, the triamine component may comprise a diamine compound. Exemplary diamine compounds include ethane diamine, propane diamine, butane diamine, pentane diamine, hexane diamine, heptane diamine, octane diamine, nonane diamine, and decane diamine.

The content of the triamine component in the antistripping composition is not particularly limited and may vary widely. In one embodiment, the antistripping composition comprises from 60 wt. % to 99 wt. % of the triamine component, e.g., from 60 wt. % to 98 wt. %, from 60 wt. % to 95 wt. % from 60 wt. % to 92 wt. % from 60 wt. % to 90 wt. %, from 60 wt. % to 88 wt. %, from 62 wt. % to 99 wt. %, from 62 wt. % to 98 wt. %, from 62 wt. % to 95 wt. % from 62 wt. % to 92 wt. % from 62 wt. % to 90 wt. %, from 62 wt. % to 88 wt. %, from 64 wt. % to 99 wt. %, from 64 wt. % to 98 wt. %, from 64 wt. % to 95 wt. % from 64 wt. % to 92 wt. % from 64 wt. % to 90 wt. %, from 64 wt. % to 88 wt. %, from 66 wt. % to 99 wt. %, from 66 wt. % to 98 wt. %, from 66 wt. % to 95 wt. % from 66 wt. % to 92 wt. % from 66 wt. % to 90 wt. %, from 66 wt. % to 88 wt. %, from 68 wt. % to 99 wt. %, from 68 wt. % to 98 wt. %, from 68 wt. % to 95 wt. % from 68 wt. % to 92 wt. % from 68 wt. % to 90 wt. %, or from 68 wt. % to 88 wt. %. In terms of lower limits, the antistripping composition may comprise greater than 60 wt. %, of the triamine component, e.g., greater than 62 wt. %, greater than 64 wt. %, greater than 66 wt. %, or greater than 68 wt. %. In terms of upper limits, the antistripping composition may comprise less than 99 wt. % of the triamine component, e.g. less than 98 wt. %, less than 95 wt. %, less than 92 wt. %, less than 90 wt. %, or less than 88 wt. %.

The content of the triamine component in the antistripping composition may also be described with reference to the triamine compound. Said another way, the content of the triamine compound may be described in terms of the total antistripping composition. In one embodiment, for example, the triamine compound may be present in the antistripping composition in an amount from 25 wt. % to 75 wt. %, e.g., from 25 wt. % to 70 wt. %, from 25 wt. %, to 65 wt. %, from 25 wt. % to 60 wt. %, from 30 wt. % to 75 wt. %, from 30 wt. % to 70 wt. %, from 30 wt. %. to 65 wt. %, from 30 wt. % to 60 wt. %, from 35 wt. % to 75 wt. %, from 35 wt. % to 70 wt. %, from 35 wt. %. to 65 wt. %, from 35 wt. % to 60 wt. %, from 40 wt. % to 75 wt. %, from 40 wt. % to 70 wt. %, from 40 wt. %. to 65 wt. %, or from 40 wt. % to 60 wt. %. In terms of lower limits, the antistripping composition may comprise greater than 25 wt. % of the triamine compound, e.g., greater than 30 wt. %, greater than 35 wt. %, or greater than 40 wt. %. In terms of upper limits, the antistripping composition may comprise less than 75 wt. % of the triamine compound, e.g., less than 70 wt. %, less than 65 wt. %, or less than 60 wt. %.

In some embodiments, the triamine component (or the composition generally) comprises nitrogen-containing compounds that are not triamines or nitriles, e.g., not the triamines or nitriles disclosed herein.

Thus the antistripping composition may comprise the triamine along with other nitrogen-containing compounds that are not the triamines or nitriles disclosed herein. For example, these nitrogen-containing compounds may comprise acetonitrile, caprolactam, aminohexanol, e.g., 6-Amino-1-hexanol, (AMOL), dipropylenetriamine (DPT), or aminocephalosporanic acid (ACA) or combinations thereof. Surprisingly, the presence of these nitrogen-containing compounds has been found to advantageously affect antistripping performance, e.g., carbonyl index performance, BBR stiffness, and/or BBR M value. As the examples show, antistripping compositions that comprise the disclosed triamines, optionally along with one or more of the synergistic nitrogen-containing compounds perform significantly better than conventional amines, e.g., diamines, in these applications.

The nitrogen-containing compounds may be present in the antistripping composition in an amount ranging from 0.01 wt % to 50 wt %, e.g., from 0.1 wt % to 50 wt %, from 1 wt % to 40 wt %, from 5 wt % to 40 wt %, from 10 wt % to 40 wt %, or from 10 wt % to 36 wt %. In terms of lower limits, the nitrogen-containing compounds may be present in the antistripping composition in an amount greater than 0.01 wt %, e.g., greater than 0.01 wt %, greater than 1 wt %, greater than 5 wt %, greater than 10 wt %, greater than 15 wt %, greater than 20 wt %, greater than 25 wt %, greater than 30 wt %, or greater than 40 wt %. In terms of upper limits, the nitrogen-containing compounds may be present in the antistripping composition in an amount less than 50 wt %, e.g., less than 45 wt %, less than 40 wt %, less than 35 wt %, less than 30 wt %, less than 25 wt %, less than 20 wt %, less than 15 wt %, less than 10 wt %, less than 5 wt %, less than 1 wt %, or less than 0.1 wt %. These ranges and limits apply to the nitrogen-containing compounds individually or collectively.

Nitrile Component

Described herein are a number of nitrile compounds, which the present inventors have found surprisingly (and synergistically with the triamine compounds) prevent, reduce, or eliminate the stripping of bitumen compositions, e.g., bituminous aggregate mixtures, such as asphalt concrete, especially when synergistically employed with the aforementioned triamines. As such, the nitrile compounds are useful as components of antistripping compositions. Thus, the antistripping compositions described herein may comprise (in addition to the triamine component) a nitrile component of one or more nitrile compounds, which may be any organic compound comprising one or more cyano, or nitrile, functional groups. In some cases, the nitrile component is different from the triamine component.

In some embodiments, the nitrile component comprises a trinitrile compound, e.g., an organic compound having three cyano, or nitrile, functional groups on a saturated or unsaturated chain of carbon atoms. For example, in some embodiments, the nitrile component comprises a trinitrile alkane, e.g., an organic compound having the chemical formula $C_xH_{2x-1}(CN)_3$, wherein x is from 4 to 10. Exemplary trinitrile compounds include butane trinitrile, e.g., tricyanobutane, pentane trinitrile, e.g., tricyanopentane, hexane trinitrile, e.g., tricyanohexane, heptane trinitrile, e.g., tricyanoheptane, octane trinitrile, e.g., tricyanooctane, nonane trinitrile, e.g., tricyanononane, and decane trinitrile, e.g., tricyanodecane, and combinations thereof. In some embodiments the trinitrile compound comprises tricyanohexane, e.g., 1,3,6-tricyanohexane and/or 1,3,5-tricyanohexane.

As discussed above, it has been found that the presence of the nitrile (cyano) moieties and the accompanying strong electronegativity and branched chemical structure provides unexpected improvements in securing the bond between the bitumen binder and the aggregate.

In particular, as one example, the combination of amine moieties along with the nitrile moieties has been found to be particularly effective because the nitrile moieties have both strong electronegativity and branched chemical structure. And the electronegativity and the structure synergistically work in conjunction with the triamine and the aggregate to improve bond strength that the triamine has with the electropositive charge centers on the surface of the aggregate. Stated another way, the nitrile moieties unexpectedly improve the bonding between the triamine and the aggregate due at least in part to the strong electronegativity and branched chemical structure of the nitrile.

In terms of chemical structures, the trinitrile compound may have the structure wherein a, b, and c are independently from 0 to 4. In some embodiments, the sum of a, b, and c, is from 3 to 10.

The content of the nitrile component in the antistripping composition is not particularly limited and may vary widely. In one embodiment, the antistripping composition comprises from 1 wt. % to 40 wt. % of the nitrile component, e.g., from 1 wt. % to 38 wt. %, from 1 wt. % to 36 wt. % from 1 wt. % to 34 wt. % from 1 wt. % to 32 wt. %, from 1 wt. % to 30 wt. %, from 1 wt. % to 10 wt. %, from 2 wt. % to 8 wt. %, from 2 wt. % to 40 wt. %, from 2 wt. % to 38 wt. %, from 2 wt. % to 36 wt. % from 2 wt. % to 34 wt. % from 2 wt. % to 32 wt. %, from 2 wt. % to 30 wt. %, from 2 wt. % to 20 wt. %, from 3 wt. % to 40 wt. %, from 3 wt. % to 38 wt. %, from 3 wt. % to 36 wt. % from 3 wt. % to 34 wt. % from 3 wt. % to 32 wt. %, from 3 wt. % to 30 wt. %, from 4 wt. % to 40 wt. %, from 4 wt. % to 38 wt. %, from 4 wt. % to 36 wt. % from 4 wt. % to 34 wt. % from 4 wt. % to 32 wt. %, from 4 wt. % to 30 wt. %, from 5 wt. % to 40 wt. %, from 5 wt. % to 38 wt. %, from 5 wt. % to 36 wt. % from 5 wt. % to 34 wt. % from 5 wt. % to 32 wt. %, or from 5 wt. % to 30 wt. %. In terms of lower limits, the antistripping composition may comprise greater than 1 wt. %, of the nitrile component, e.g., greater than 2 wt. %, greater than 3 wt. %, greater than 4 wt. %, or greater than 5 wt. %. In terms of upper limits, the antistripping composition may comprise less than 40 wt. % of the nitrile component, e.g. less than 38 wt. %, less than 36 wt. %, less than 34 wt. %, less than 32 wt. %, or less than 30 wt. %. These ranges and limits are applicable to nitriles as a whole or individual nitriles or combinations of select nitriles.

In some embodiments, the nitrile component comprises a trinitrile compound, e.g., tricyanohexane, in an amount ranging from 60 wt. % to 100 wt. %, based on the total weight of the nitrile component, e.g., from 60 wt. % to 99.99 wt. %, from 60 wt. %, to 99.9 wt. %, from 60 wt. % to 99 wt. %, from 65 wt. % to 100 wt. %, from 65 wt. % to 99.99 wt. %, from 65 wt. %, to 99.9 wt. %, from 65 wt. % to 99 wt. %, from 70 wt. % to 100 wt. %, from 70 wt. % to 99.99 wt. %, from 70 wt. %, to 99.9 wt. %, from 70 wt. % to 99 wt. %, from 75 wt. % to 100 wt. %, from 75 wt. % to 99.99 wt. %, from 75 wt. %, to 99.9 wt. %, or from 75 wt. % to 99 wt. %. In terms of upper limits, the nitrile component may comprise less than 100 wt. % of the trinitrile compound, e.g., tricyanohexane, e.g., less than 99.99 wt. %., less than 99.9 wt. %, or less than 99 wt. %. In terms of lower limits, the nitrile component may comprise greater than 60 wt. % of the trinitrile compound, e.g., tricyanohexane, e.g., greater than 65 wt. %, greater than 70 wt. %, or greater than 75 wt. %.

In some embodiments, the nitrile component comprises a dinitrile compound, e.g., an organic compound having two cyano, or nitrile, functional groups on a saturated or unsaturated chain of carbon atoms. For example, in some embodiments, the nitrile component comprises a dinitrile alkane, e.g., an organic compound having the chemical formula $C_xH_{2x}(CN)_2$, wherein x is from 1 to 6. Exemplary dinitrile compounds include malonitrile, e.g., dicyanomethane, succinonitrile, e.g., dicyanoethane, glutaronitrile, e.g., dicyanopropane, adiponitrile, e.g., dicyanobutane, pentane dinitrile, e.g., dicyanopentane, and hexane dinitrile, e.g., dicyanohexane.

In some embodiments, the nitrile component comprises a dinitrile, e.g., adiponitrile, in an amount ranging from 0 wt. % to 15 wt. %, based on the total weight of the nitrile component e.g., from 0 wt. % to 12 wt. %, from 0 wt. % to 10 wt. %, from 0 wt. % to 8 wt. %, from 0 wt. % to 5 wt. %, from 1 wt. % to 15 wt. %, from 1 wt. % to 12 wt. %, from 1 wt. % to 10 wt. %, from 1 wt. % to 8 wt. %, from 1 wt. % to 5 wt. %, from 2 wt. % to 15 wt. %, from 2 wt. % to 12 wt. %, from 2 wt. % to 10 wt. %, from 2 wt. % to 8 wt. %, from 2 wt. % to 5 wt. %, from 3 wt. % to 15 wt. %, from 3 wt. % to 12 wt. %, from 3 wt. % to 10 wt. %, from 3 wt. % to 8 wt. %, from 3 wt. % to 5 wt. %, from 4 wt. % to 15 wt. %, from 4 wt. % to 12 wt. %, from 4 wt. % to 10 wt. %, from 4 wt. % to 8 wt. %, or from 4 wt. % to 5 wt. %. In terms of upper limits, the nitrile component may comprise less than 15 wt. % of the dinitrile, e.g., adiponitrile, e.g., less than 12 wt. %, less than 10 wt. %, less than 8 wt. %, or less than 5 wt. %. In terms of lower limits, the nitrile component may comprise greater than 0 wt. % of the dinitrile compound, e.g., adiponitrile, e.g., greater than 1 wt. %, greater than 2 wt. %, greater than 3 wt. %, or greater than 4 wt. %.

In some embodiments, the nitrile component comprises a mononitrile compound, e.g., an organic compound having one cyano, or nitrile, functional groups on a saturated or unsaturated chain of carbon atoms. For example, in some embodiments, the nitrile component comprises a nitrile alkane, e.g., an organic compound having the chemical formula $C_xH_{2x+1}(CN)$, wherein x is from 1 to 6. Exemplary nitrile compounds include acetonitrile, e.g., cyanomethane, propionitrile, e.g., cyanoethane, butryronitrile, e.g., cyanopropane, valeronitrile, e.g., cyanobutane, pentane nitrile, e.g., cyanopentane, and hexane nitrile, e.g., cyanohexane.

In some embodiments, the nitrile component comprises a mixture of the above-noted compounds. For example, a combination of one or more trinitriles, dinitriles, and/or mononitriles may be used.

In some embodiments, the nitrile component comprises one or more co-product streams of another industrial chemical production process. For example, the nitrile component may comprise one or more co-product streams from different processes or systems, e.g., the production of adiponitrile, acrylonitrile, allyl cyanide, butyronitrile, polyacrylonitrile, polyamides, polyaramids, or combinations thereof. In a specific case, the nitrile component may be an adiponitrile process stream, e.g., one or more co-product streams, purge streams, or flash tails from an adiponitrile production process. In some cases, co-product streams from multiple processes for may be combined to form the nitrile component. In some cases, the nitrile component may comprise a co-product stream that has been partially treated and/or purified. For example, the nitrile component may comprise a stream formed the by distillation or evaporation of a co-product stream, e.g., by a wiped-film evaporator.

Organic Additive

In some embodiments, the antistripping composition further comprises an (optional) organic additive. In some cases, the addition of an organic additive, as described herein, unexpectedly improves the ability of the antistripping composition to reduce or eliminate the moisture susceptibility of a bituminous aggregate mixture (such as asphalt concrete). In particular, the organic additive may lower the melting point of the antistripping composition. As a result, the organic additive may ensure that the antistripping composition remains in a liquid state. Thus, the antistripping compositions described herein exhibit greater thermal stability relative to conventional antistripping additives.

The organic additive may comprise, for example, a vegetable oil. The composition of the vegetable oil used in the organic additive is not particularly limited, and any long chain hydrocarbon, e.g., triglycerides, extracted or derived from plant matter may be used. Exemplary vegetable oils suitable for use in the antistripping composition include canola oil, castor oil, coconut oil, corn oil, cottonseed oil, distilled tall oil, flax seed oil, jetropa oil, linseed oil, mustard oil, olive oil, palm oil, peanut oil, rapeseed oil, safflower oil, sesame oil, sunflower oil, soybean oil, soy oil, castor oil, tung oil, tigernut oil, and combinations thereof. In some particular embodiments, the antistripping composition comprises soy oil.

The organic additive may comprise, for example, an ester. The composition of the ester used in the organic additive is not particularly limited. In some cases, the ester comprises a carboxylate ester, an orthoester, a phosphate ester, a sulfate ester, a nitrate ester, a borate, a carbonate ester, or combinations thereof.

In some embodiments, the organic additive comprises an ester having the chemical structure:

wherein a and b are independently from 0 to 4. Exemplary esters according to the above structure include methyl acetate, methyl propionate, methyl butyrate, methyl valerate, methyl caproate, ethyl acetate, ethyl propionate, ethyl butyrate, ethyl valerate, ethyl caproate, propyl acetate, propyl propionate, propyl butyrate, propyl valerate, propyl caproate, butyl acetate, butyl propionate, butyl butyrate, butyl valerate, butyl caproate, pentyl acetate, pentyl propionate, pentyl butyrate, pentyl valerate, pentyl caproate, and combinations thereof.

In some embodiments, the organic additive comprises an ester having the chemical wherein c is from 1 to 8, and wherein each R is independently a $C_1$-$C_3$ alkyl group, a $C_2$-$C_4$ alkenyl group, or a $C_1$-$C_3$ alcohol group. Exemplary esters according to the above structure include dimethyl malonate, dimethyl succinate, dimethyl glutarate, dimethyl adipate, dimethyl pimelate, dimethyl suberate, diethyl malonate, diethyl succinate, diethyl glutarate, diethyl adipate, diethyl pimelate, diethyl suberate, dipropyl malonate, dipropyl succinate, dipropyl glutarate, dipropyl adipate, dipropyl pimelate, dipropyl suberate, ethyl methyl malonate, ethyl methyl succinate, ethyl methyl glutarate, ethyl methyl aethylpate, ethyl methyl pimelate, ethyl methyl suberate, and combinations thereof.

In some embodiments, the organic additive comprises an alcohol. As some examples, the organic additive may be the corresponding alcohol of the aforementioned esters. For example, the alcohol may include at least one of a methanol, an ethanol, a N-propanol, a butanol, pentanol, hexanol, an octanol, an N-octanol, a tetrahydrofurfuryl alcohol (THFA), a cyclohexanol, a cyclopentanol, and a terpineol. The N-propanol may include at least one of a 1-propanol, a 2-propanol, and a 1-methoxy-2-propanol. The butanol may include at least one of a 1-butanol and a 2-butanol. The pentanol may include at least one of a 1-pentanol, a 2-pentanol, and a 3-pentanol. The hexanol may include at least one of a 1-hexanol, a 2-hexanol, and a 3-hexanol. The N-octanol may include at least one of a 1-octanol, a 2-octanol, and a 3-octanol.

In some embodiments, the alcohol comprises ethanol, propanol, or alkylene glycols, or combinations thereof. In some cases, the organic additive comprises ethanol, propanol, or alkylene glycols, or corresponding esters of thereof, or combinations thereof.

In some embodiments, the organic additive comprises a vegetable oil and an ester. For example, the organic additive may comprise soy oil and ethyl acetate. In these embodiments, the relative content of the vegetable oil and the ester are not particular limited and may, for example, be (approximately) equal.

The content of the organic additive in the antistripping composition is not particularly limited and may vary widely. In one embodiment, the antistripping composition comprises from 0 wt. % to 20 wt. % of the organic additive, e.g., from 0 wt. % to 19 wt. %, from 0 wt. % to 18 wt. % from 0 wt. % to 17 wt. % from 0 wt. % to 16 wt. %, from 0 wt. % to 15 wt. %, from 1 wt. % to 20 wt. %, from 1 wt. % to 19 wt. %, from 1 wt. % to 18 wt. % from 1 wt. % to 17 wt. % from 1 wt. % to 16 wt. %, from 1 wt. % to 15 wt. %, from 2 wt. % to 20 wt. %, from 2 wt. % to 19 wt. %, from 2 wt. % to 18 wt. % from 2 wt. % to 17 wt. % from 2 wt. % to 16 wt. %, from 2 wt. % to 15 wt. %, from 3 wt. % to 20 wt. %, from 3 wt. % to 19 wt. %, from 3 wt. % to 18 wt. % from 3 wt. % to 17 wt. % from 3 wt. % to 16 wt. %, from 3 wt. % to 15 wt. %, from 4 wt. % to 20 wt. %, from 4 wt. % to 19 wt. %, from 4 wt. % to 18 wt. % from 4 wt. % to 17 wt. % from 4 wt. % to 16 wt. %, or from 4 wt. % to 15 wt. %. In terms of lower limits, the antistripping composition may comprise greater than 0 wt. %, of the organic additive, e.g., greater than 1 wt. %, greater than 2 wt. %, greater than 3 wt. %, or greater than 4 wt. %. In terms of upper limits, the antistripping composition may comprise less than 20 wt. % of the organic additive, e.g. less than 19 wt. %, less than 18 wt. %, less than 17 wt. %, less than 16 wt. %, or less than 15 wt. %.

In some embodiments, any or some of the steps or components disclosed herein may be considered optional. In some cases, any or some of the aforementioned items in this description may expressly excluded, e.g., via claim language. For example claim language may be modified to recite that the composition does not comprise or excludes castor oil.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to." For example, "greater than 4.0" may be interpreted as, and subsequently modified in the claims as "greater than or equal to 4.0."

Exemplary Compositions

In one embodiment, the composition comprises from 2 wt. % to 20 wt. % TCH (tricyanohexane) and/or ADN (adiponitrile), from 40 wt. % to 90 wt. % BHMT (bis (hexamethylene) triamine, and from 2 wt. % to 20 wt. % ethanol.

In one embodiment, the composition comprises from 1 wt. % to 20 wt. % ADN, from 40 wt. % to 90 wt. % BHMT, and from 2 wt. % to 20 wt. % ethanol.

In one embodiment, the composition comprises from 2 wt. % to 20 wt. % TCH, from 40 wt. % to 90 wt. % BHMT, and from 2 wt. % to 20 wt. % ethanol.

In one embodiment, the composition comprises from 2 wt. % to 20 wt. % TCH and/or ADN, from 40 wt. % to 90 wt. % BHMT, and from 2 wt. % to 20 wt. % ethyl acetate.

Additional Components

The antistripping composition may comprise (optional) additional components beyond the triamine component, nitrile component, and organic additive described above. In some cases, the antistripping composition preferable comprises relatively little of these additional components.

In some embodiments, the antistripping composition may comprise trace amounts of water. In one embodiment, for example, the antistripping composition comprises from 0 ppm to 100 ppm water, e.g., from 0 ppm to 80 ppm, from 0 ppm to 60 ppm, from 0 ppm to 40 ppm, from 0 ppm to 20 ppm, from 0.2 ppm to 100 ppm, from 0.2 ppm to 80 ppm, from 0.2 ppm to 60 ppm, from 0.2 ppm to 40 ppm, from 0.2 ppm to 20 ppm, from 0.4 ppm to 100 ppm, from 0.4 ppm to 80 ppm, from 0.4 ppm to 60 ppm, from 0.4 ppm to 40 ppm, from 0.4 ppm to 20 ppm, from 0.6 ppm to 100 ppm, from 0.6 ppm to 80 ppm, from 0.6 ppm to 60 ppm, from 0.6 ppm to 40 ppm, from 0.6 ppm to 20 ppm, from 0.8 ppm to 100 ppm, from 0.8 ppm to 80 ppm, from 0.8 ppm to 60 ppm, from 0.8 ppm to 40 ppm, from 0.8 ppm to 20 ppm, from 1 ppm to 100 ppm, from 1 ppm to 80 ppm, from 1 ppm to 60 ppm, from 1 ppm to 40 ppm, or from 1 ppm to 20 ppm. In terms of lower limits, the antistripping composition may comprise greater than 0 ppm water, e.g., greater than 0.2 ppm, greater than 0.4 ppm, greater than 0.6 ppm, greater than 0.8 ppm, or greater than 1 ppm. In terms of upper limits, the antistripping composition may comprise less than 100 ppm water, e.g., less than 80 ppm, less than 60 ppm, less than 40 ppm, or less than 20 ppm.

In some embodiments, the antistripping composition comprises substantially no water.

In some cases, the presence of a small amount of water has surprisingly been found to aid in performance, for example when the antistripping composition comprises mostly triamine component and little or no nitrile component. In some embodiments, the antistripping composition comprises water in an amount ranging from 0.01 wt % to 15 wt %, e.g., from 0.01 wt % to 10 wt %, from 0.1 wt % to 10 wt %, from 0.5 wt % to 10 wt %, from 1 wt % to 8 wt %, or from 3 wt % to 8 wt %. In terms of lower limits, the water may be present in the antistripping composition in an amount greater than 0.01 wt %, e.g., greater than 0.1 wt %, greater than 0.5 wt %, greater than 1 wt %, greater than 2 wt %, greater than 3 wt %, greater than 4 wt %, greater than 5 wt %, or greater than 6 wt %. In terms of upper limits, the water may be present in the antistripping composition in an amount less than 15 wt %, e.g., less than 10 wt %, less than 8 wt %, less than 5 wt %, less than 3 wt %, less than 1 wt %, less than 0.5 wt %, or less than 0.1 wt %.

Characteristics of the Antistripping Composition

As detailed above, the antistripping composition of the present disclosure comprises components, e.g., the triamine component, having amino, or nitrogen, moieties. The content of the amino moiety, particularly the amount of the active hydrogen, e.g., hydrogen bonded to a nitrogen atom), in the antistripping composition may be reported as an amine value. The amine value is reported as the mass (in milligrams) of potassium hydroxide (KOH) equal in basicity to one gram of the triamine composition.

In some embodiments, the antistripping composition of the present disclosure has an amine value of from 5 mg KOH/g to 20 mg KOH/g, e.g., from 5 mg KOH/g to 18 mg KOH/g, from 5 mg KOH/g to 16 mg KOH/g, from 5 mg KOH/g to 14 mg KOH/g, from 5 mg KOH/g to 12 mg KOH/g, from 6 mg KOH/g to 20 mg KOH/g, from 6 mg KOH/g to 18 mg KOH/g, from 6 mg KOH/g to 16 mg KOH/g, from 6 mg KOH/g to 14 mg KOH/g, from 6 mg KOH/g to 12 mg KOH/g, from 7 mg KOH/g to 20 mg KOH/g, from 7 mg KOH/g to 18 mg KOH/g, from 7 mg KOH/g to 16 mg KOH/g, from 7 mg KOH/g to 14 mg KOH/g, from 7 mg KOH/g to 12 mg KOH/g, from 8 mg KOH/g to 20 mg KOH/g, from 8 mg KOH/g to 18 mg KOH/g, from 8 mg KOH/g to 16 mg KOH/g, from 8 mg KOH/g to 14 mg KOH/g, from 8 mg KOH/g to 12 mg KOH/g, from 9 mg KOH/g to 20 mg KOH/g, from 9 mg KOH/g to 18 mg KOH/g, from 9 mg KOH/g to 16 mg KOH/g, from 9 mg KOH/g to 14 mg KOH/g, or from 9 mg KOH/g to 12 mg KOH/g. In terms of lower limits, the antistripping composition may have an amine value greater than 5 mg KOH/g, e.g., greater than 6 mg KOH/g, greater than 7 mg KOH/g, greater than 8 mg KOH/g, or greater than 9 mg KOH/g. In terms of upper limits, the antistripping composition may have an amine value less than 20 mg KOH/g, less than 18 mg KOH/g, less than 16 mg KOH/g, less than 14 mg KOH/g, or less than 12 mg KOH/g.

In some embodiments, the antistripping composition is a solution of the above-discussed components. Said another way, in some embodiments, the components of the antistripping composition, e.g., the triamine component, the nitrile component, and/or the organic additive) from a substantially stable solution, e.g., at or below room temperature (from about 20° C. to 25° C.). In some cases, the antistripping composition is soluble for over 3 hours, for over 5 hours, for over 7 hours, for over 10 hours, for over 12 hours, or for over 14 hours. In some embodiment, the antistripping composition is soluble indefinitely.

In some embodiments, the antistripping composition is in a liquid state. In particular, in some embodiments, the antistripping composition is a liquid at or below room temperature (from about 20° C. to 25° C.).

Bitumen Composition

In addition to the antistripping composition itself, the present disclosure provides bitumen compositions comprising the antistripping composition. In particular, the present disclosure provides bitumen compositions comprising a bituminous material, e.g., asphalt, and the antistripping composition detailed above. The presence of the antistripping composition in the bitumen compositions described herein beneficially reduce the susceptibility of the bitumen compositions (and the paved and/or compacted surfaces produced therefrom) to moisture and stripping.

The bitumen compositions of the present disclosure comprise a bituminous material. The compositions of the bituminous material is not particularly limited and may vary widely. The bituminous material may comprise any thermoplastic, naturally occurring or pyrolytically obtained substance comprised almost entirely of carbon and hydrogen and optionally comprising nitrogen, sulfur, and oxygen. As used herein, the term bituminous material is intended to include heavy oils, tars, crude residuum, pitch, asphalts, asphaltites, e.g., gilsonite, and asphaltenes.

In some embodiments, the bituminous material comprises an asphalt, e.g., an asphalt binder. As used herein, asphalt refers to any of the varieties of naturally-occurring and petroleum-derived bitumens of varying molecular weights from about 400 to above 5000, and composed of hydrocarbons and heterocyclics containing nitrogen, sulfur, and oxygen. The asphalt typically comprises naphthene aromatics, e.g., naphthalene, polar aromatics, e.g., high molecular weight phenols and carboxylic acids, saturated hydrocarbons, and/or asphaltenes, e.g., high molecular weight phenols and heterocyclic compounds.

The bituminous material, e.g., asphalt, may comprise or otherwise be suitable for use in hot-mix asphalt concrete (HMA), warm-mix asphalt concrete (WMA), and/or cold-mix asphalt concrete, e.g., cut-back asphalt concrete.

In embodiments wherein the bituminous material comprises asphalt, the viscosity grading of the asphalt is not particular limited. In some cases, the asphalt is has a grading of AC-2.5, AC-5, AC-10, AC-20, AC-30, AC-40, AR-10, AR-20, AR-40, AR-80, and/or AR-160, as measured according to AASTHO M 226.

In some embodiments wherein the bituminous material comprises asphalt, the asphalt may comprise a performance grade (PG) asphalt. Performance grading of asphalts is typically reported using two numbers: a first number giving the average seven-day maximum pavement temperature (in ° C.) (referred to herein as the "high-grade temperature"), and the second number giving the minimum pavement design temperature likely to be experience (in ° C.) (referred to herein as the "low-grade temperature"). In some embodiments, the bituminous material comprises a PG asphalt having a high-grade temperature from 50° C. to 80° C., e.g., from 55° C. to 75° C. or from 60° C. to 70° C., and a low-grade temperature from −10° C. to −40° C., e.g., from −15° C. to −35° C. or from −20° C. to −30° C.

As noted, the bitumen composition comprises an antistripping composition according to the present disclosure. The content of the antistripping composition in the bitumen composition is not particularly limited. In some embodiments, the bitumen composition comprises from 0.05 wt. % to 2 wt. % of the antistripping composition, e.g., from 0.05 wt. % to 1.75 wt. %, from 0.05 wt. % to 1.5 wt. %, from 0.05 wt. % to 1.25 wt. %, from 0.05 wt. % to 1 wt. %, from 0.05 wt. % to 0.75 wt. %, from 0.1 wt. % to 2 wt. %, from 0.1 wt. % to 1.75 wt. %, from 0.1 wt. % to 1.5 wt. %, from 0.1 wt. % to 1.25 wt. %, from 0.1 wt. % to 1 wt. %, from 0.1 wt. % to 0.75 wt. %, from 0.15 wt. % to 2 wt. %, from 0.15 wt. % to 1.75 wt. %, from 0.15 wt. % to 1.5 wt. %, from 0.15 wt. % to 1.25 wt. %, from 0.15 wt. % to 1 wt. %, from 0.15 wt. % to 0.75 wt. %, from 0.2 wt. % to 2 wt. %, from 0.2 wt. % to 1.75 wt. %, from 0.2 wt. % to 1.5 wt. %, from 0.2 wt. % to 1.25 wt. %, from 0.2 wt. % to 1 wt. %, from 0.2 wt. % to 0.75 wt. %, from 0.25 wt. % to 2 wt. %, from 0.25 wt. % to 1.75 wt. %, from 0.25 wt. % to 1.5 wt. %, from 0.25 wt. % to 1.25 wt. %, from 0.25 wt. % to 1 wt. %, or from 0.25 wt. % to 0.75 wt. %. In terms of lower limits, the bitumen composition may comprise greater than 0.05 wt. % of the antistripping composition, e.g., greater than 0.1 wt. %, greater than 0.15 wt. %, greater than 0.2 wt. %, or greater than 0.25 wt. %. In terms of upper limits, the bitumen composition may comprise less than 2 wt. % of the antistripping composition, e.g., less than 1.75 wt. %, less than 1.5 wt. %, less than 1.25 wt. %, less than 1 wt. %, or less than 0.75 wt. %.

In some embodiments, the disclosure relates to a process for improving durability in the aforementioned bitumen composition. The process comprises the step of adding the antistripping composition to the bitumen composition to form a treated bitumen composition. The treated bitumen composition may demonstrate the performance features described herein. In some embodiments, the antistripping composition is added in the amounts provided above. In some embodiments, the antistripping composition is added in an amount ranging from 0.05 wt. % to 20 wt. %, e.g., from 0.1 wt % to 20 wt %, e.g., from 0.1 wt % to 10 wt %, from 0.1 wt % to 5 wt %, or from 0.2 wt % to 4 wt %. In terms of lower limits, the antistripping composition may be added in an amount greater than 0.1 wt %, e.g., greater than 0.2 wt %, greater than 0.3 wt %, greater than 0.5 wt %, greater than 0.8 wt %, greater than 1.0 wt %, greater than 1.5 wt %, greater than 2.0 wt %, greater than 2.5 wt %, greater than 3.0 wt %, or greater than 5 wt %. In terms of upper limits, the antistripping composition may be added in an amount less than 20 wt %, e.g., less than 15 wt %, less than 10 wt %, less than 8 wt %, less than 5 wt %, less than 3 wt %, or less than 1 wt %. 0.05 wt. % to 2 wt. %

Characteristics of the Bitumen Composition

The bitumen compositions described herein advantageously demonstrate reduced susceptibility to moisture damage and stripping. In particular, the inclusion of the antistripping composition in the bitumen composition improves the performance characteristics, e.g., moisture resistance, of the overall bitumen compositions and of the paved and/or compacted surfaces produced therefrom.

As noted above, numerous test procedures assess the moisture susceptibility of a bitumen composition (such as asphalt concrete). In the boiling water test, defined by ASTM D 3625, a loose, e.g., non-paved and non-compacted, sample of bitumen composition, e.g., asphalt concrete, is added to boiling water and the percentage of total visible area of aggregate surface that retains its bond to the bituminous binder, e.g., asphalt, coating is measured. Although the boiling water test may be subject, it provides a simple and fast determination of the susceptibility of a bitumen composition to stripping.

In some embodiments, the bitumen composition of the present disclosure exhibits at least 60% coating retention, when measured according to ASTM D 3625, e.g., at least 65%, at least 68%, at least 70%, at least 72% or at least 75%. In terms of upper limits, the bitumen composition may exhibit a coating retention less than 100%, e.g., less than 98%, less than 95%, less than 92%, or less than 90%. In terms of ranges the bitumen composition may exhibit a coating retention from 60% to 100%, e.g., from 60% to 98%, from 60% to 95%, from 60% to 92%, from 60% to 90%, 65% to 100%, from 65% to 98%, from 65% to 95%, from 65% to 92%, from 65% to 90%, 68% to 100%, from 68% to 98%, from 68% to 95%, from 68% to 92%, from 68% to 90%, 70% to 100%, from 70% to 98%, from 70% to 95%, from 70% to 92%, from 70% to 90%, 72% to 100%, from 72% to 98%, from 72% to 95%, from 72% to 92%, from 72% to 90%, 75% to 100%, from 75% to 98%, from 75% to 95%, from 75% to 92%, or from 75% to 90%.

In the modified Lottman test, defined by AASHTO T 283, the tensile strength of unconditioned samples of a bitumen composition (such as asphalt concrete) are compared to the tensile strength of samples that have been partially saturated with water. The results are reported as the ratio of the dry tensile strength to the water conditioned (wet) tensile strength. Although it is typically expected that the water conditioned samples will have a lower tensile strength, lower values indicate greater susceptibility of the bitumen composition to moisture damage.

In some embodiments, the bitumen composition of the present disclosure exhibits a tensile strength ratio greater than 80, when measured according to AASHTO T 283, e.g., greater than 82, greater than 85, greater than 88, greater than 90, greater than 92, or greater than 95. In terms of upper limits, the bitumen composition may exhibit a tensile strength ratio less than 100, e.g., less than 99.5 or less than 99. In terms of ranges, the bitumen composition may exhibit a tensile strength ratio from 80 to 100, e.g., from 82 to 100, from 85 to 100, from 88 to 100, from 90 to 100, from 92 to 100, from 95 to 100, from 80 to 99.5, from 82 to 99.5, from 85 to 99.5, from 88 to 99.5, from 90 to 99.5, from 92 to 99.5, from 95 to 99.5, from 80 to 99, from 82 to 99, from 85 to 99, from 88 to 99, from 90 to 99, from 92 to 99, or from 95 to 99.

In the Hamburg wheel tracking test, defined by AASHTO T 324, bitumen compositions, e.g., asphalt concrete, are tested underwater to better understand moisture susceptibility. In this test, a loaded steel wheel tracks of a sample of the compacted bitumen composition in a heated water bath, and the deformation of the sample is observed.

In some embodiments, compacted samples of the bitumen compositions described herein exhibit a Hamburg wheel track testing rut depth of less than 10 mm, measured according to AASHTO T 324, e.g., less than 9 mm, less than 8 mm, less than 7 mm, less than 6 mm, or less than 5 mm. In terms of lower limits, the compacted samples of the bitumen composition may exhibit a Hamburg wheel track testing rut depth of greater than 1 mm, e.g., greater than 1.5 mm, greater than 2 mm, or greater than 2.5 mm. In terms of ranges, the compacted samples of the bitumen composition may exhibit a Hamburg wheel track testing rut depth of from 1 mm to 10 mm, e.g., from 1 mm to 9 mm, from 1 mm to 8 mm, from 1 mm to 7 mm, from 1 mm to 6 mm, from 1 mm to 5 mm, from 1.5 mm to 10 mm, from 1.5 mm to 9 mm, from 1.5 mm to 8 mm, from 1.5 mm to 7 mm, from 1.5 mm to 6 mm, from 1.5 mm to 5 mm, from 2 mm to 10 mm, from 2 mm to 9 mm, from 2 mm to 8 mm, from 2 mm to 7 mm, from 2 mm to 6 mm, from 2 mm to 5 mm, from 2.5 mm to 10 mm, from 2.5 mm to 9 mm, from 2.5 mm to 8 mm, from 2.5 mm to 7 mm, from 2.5 mm to 6 mm, or from 2.5 mm to 5 mm.

Additional test methods for assessing the moisture susceptibility of the bitumen composition and of the paved and/or compacted surfaces produced therefrom include the Tunnicliff and Root conditioning test (defined by ASTM D 4867), the static-immersion test (defined by AASHTO T 182), and the immersion-compression test (defined by AASHTO T 165).

Carbonyl Index

In some embodiments, compacted samples of the bitumen compositions described herein exhibit a carbonyl index reduction greater than 0.1, as measured against a control and after 20 hours of aging ($PAV_{20}$) under ASTM D7214 (current year), e.g., greater than 0.15, greater than 0.2., greater than 0.25, or greater than 0.3.

In some embodiments, compacted samples of the bitumen compositions described herein exhibit a carbonyl index reduction greater than 0.1, as measured against a control and after 40 hours of aging ($PAV_{40}$) under ASTM D7214 (current year), e.g., greater than 0.15, greater than 0.2., greater than 0.25, greater than 0.3, greater than 0.35, or greater than 0.4.

In some embodiments, compacted samples of the bitumen compositions described herein exhibit a carbonyl index reduction greater than 0.1, as measured against a control and after 60 hours of aging ($PAV_{60}$) under ASTM D7214 (current year), e.g., greater than 0.15, greater than 0.2., greater than 0.25, greater than 0.3, greater than 0.35, greater than 0.4, greater than 0.5, greater than 0.6, or greater than 0.7.

BBR Stiffness

In some embodiments, compacted samples of the bitumen compositions described herein exhibit a BBR Stiffness less than 222 MPa, as measured in accordance with AASHTO T313 (current year) and after 20 hours of aging ($PAV_{20}$), e.g., less than 220 MPa, less than 218 MPa, less than 216 MPa, less than 214 MPa, or less 212 MPa.

In some embodiments, compacted samples of the bitumen compositions described herein exhibit a BBR Stiffness less than 222 MPa, as measured in accordance with AASHTO T313 (current year) and after 40 hours of aging ($PAV_{40}$), e.g., less than 248 MPa, less than 247 MPa, less than 245 MPa, less than 242 MPa, less than 240 MPa, or less 239.

In some embodiments, compacted samples of the bitumen compositions described herein exhibit a BBR Stiffness less than 222 MPa, as measured in accordance with AASHTO T313 (current year) and after 60 hours of aging ($PAV_{60}$), e.g., less than 288 MPa, less than 285 MPa, less than 280 MPa, less than 275 MPa, or less 271.

BBR M Value

In some embodiments, compacted samples of the bitumen compositions described herein exhibit a BBR M value greater than 0.341, as measured in accordance with AASHTO T313 (current year) and after 20 hours of aging ($PAV_{20}$), e.g., greater than 0.3415, greater than 0.342, greater than 0.3425, or greater than 0.343.

In some embodiments, compacted samples of the bitumen compositions described herein exhibit a BBR M value greater than 0.312, as measured in accordance with AASHTO T313 (current year) and after 40 hours of aging ($PAV_{40}$), e.g., greater than 0.3125, greater than 0.313, greater than 0.314, or greater than 0.315.

In some embodiments, compacted samples of the bitumen compositions described herein exhibit a BBR M value greater than 0.288, as measured in accordance with AASHTO T313 (current year) and after 60 hours of aging ($PAV_{60}$), e.g., greater than 0.290, greater than 0.292, greater than 0.294, greater than 0.295.

EXAMPLES

The present disclosure will be further understood by reference to the following non-limiting examples.

Six samples of the antistripping composition described herein were prepared to assess their effectiveness in reducing the moisture susceptibility of an asphalt concrete composition. A 60 wt. % solution/composition of bis(hexamethylene(triamine) (BHMT) was used as the triamine component (the reminder of which comprised nitrogen-containing impurities that were not triamines/nitriles disclosed herein). A solution of adiponitrile (ADN) and tricyanohexane (TCH) or TCH alone was used as the nitrile component. The solution of ADN and TCH comprised ADN in an amount from about 1.6 wt. % to 8.6 wt. % and TCH in an amount from about 80 wt. %. to about 90 wt. %. For comparison, an comparative sample (Comp. Ex. A) was prepared using the 60 wt. % solution of di(6-amino-hexyl) amine as a triamine component and a solution of diaminocyclohexane (DACH) and hexamethylenediamine (HMD) instead of a nitrile component. Comp. Ex. A represents a conventional antistripping composition. The compositions of the sample antistripping compositions are reported in Table 1A. In some cases, amounts of nitrogen-containing compounds (other than BHMT, ADN, and TCH) were present as well.

TABLE 1A

Exemplary Antistripping Compositions for Testing

| | Triamine Component | | Nitrile Component | | Organic Additive | | Water |
|---|---|---|---|---|---|---|---|
| | Cpd. | wt. % | Cpd. | wt. % | Cpd. | wt. % | ppm |
| Ex. 1 | BHMT comp. | 85 | ADN TCH | 5 | Ethyl acetate Veg. oil | 46 | 1.1 |
| Ex. 2 | BHMT comp. | 80 | ADN TCH | 10 | Ethyl acetate Soy oil | 10 | 1.43 |
| Ex. 3 | BHMT comp. | 85 | TCH | 5 | Ethyl acetate Soy oil | 10 | 1.03 |
| Ex. 4 | BHMT comp. | 80 | ADN TCH | 16 | Ethyl acetate | 4 | 1.43 |
| Ex. 5 | BHMT comp. | 80 | TCH | 16 | Ethyl acetate | 4 | — |
| Ex. 6 | BHMT comp. | 80 | TCH | 16 | Ethanol | 4 | — |
| Comp. Ex. A | BHMT comp. | 70 | DACH HMD | 30 | — | — | — |

Using the above exemplary (and comparative) antistripping compositions, sample bitumen compositions (BC Exs. 1-6) were prepared for analysis. Each sample was prepared using a performance grade asphalt having a high-grade temperature of 64° C. and low-grade temperature of −22° C. (referred to as "PG 64-22"). The bitumen compositions were prepared using 0.5 wt. % of the exemplary antistripping compositions Exs. 1-6. For comparison, a bitumen composition was prepared using 0.5 wt. % of Comp. Ex. A (BC Comp. Ex. A). For further comparison, a bitumen composition was prepared using no antistripping composition (BC Comp. Ex. B). The compositions of the sample bitumen compositions are reported in Table 1B.

TABLE 1B

Exemplary Bitumen Compositions for Testing

| | Anti-Strip Comp. | | Asphalt | |
|---|---|---|---|---|
| | Cpd. | wt. % | Cpd. | wt. % |
| BC Ex. 1 | Ex. 1 | 0.5 | PG 64-22 | 99.5 |
| BC Ex. 2 | Ex. 2 | 0.5 | PG 64-22 | 99.5 |
| BC Ex. 3 | Ex. 3 | 0.5 | PG 64-22 | 99.5 |
| BC Ex. 4 | Ex. 4 | 0.5 | PG 64-22 | 99.5 |
| BC Ex. 5 | Ex. 5 | 0.5 | PG 64-22 | 99.5 |
| BC Ex. 6 | Ex. 6 | 0.5 | PG 64-22 | 99.5 |
| BC Comp. Ex. A | Comp. Ex. A | 0.5 | PG 64-22 | 99.5 |
| BC Comp. Ex. B | — | — | PG 64-22 | 100 |

The moisture susceptibility of the above exemplary bitumen compositions was assessed by numerous tests. For each exemplary bitumen composition, the boiling water test was carried out according to ASTM D 3625 to assess the adhesion of the asphalt binder. Results of this test are reported in Table 2.

TABLE 2

Boiling Water Test (ASTM D 3625)

| | Observation | | |
|---|---|---|---|
| | Approx. Percent Coated | Approx. Percent Not Coated | Ranking |
| BC Ex. 1 | 78 | 22 | 2 |
| BC Ex. 2 | 76 | 24 | 3 |
| BC Ex. 3 | 75 | 25 | 4 |
| BC Ex. 4 | 80 | 20 | 1 |
| BC Ex. 5 | 80 | 20 | 1 |
| BC Ex. 6 | 80 | 20 | 1 |
| BC Comp. Ex. A | 72 | 28 | 5 |
| BC Comp. Ex. B | 15 | 85 | 6 |

The results of the boiling water test indicate that all six exemplary bitumen compositions, BC Examples 1-6, exhibited good adhesion. Comparative Example B, which was a conventional asphalt concrete composition having no antistripping additive, exhibited extreme de-bonding (stripping) in the presence of water, which is typical of asphalt concrete compositions without any modification. Each of BC Examples 1-6, which include antistripping compositions according to the present disclosure, exhibited much better adhesion (percent coateing) than Comparative Example B. In addition, each of BC Examples 1-6 exhibited better adhesion than Comparative Example A, which included a conventional antistripping additive. BC Exs. 4, 5, and 6 performed particularly well.

For each exemplary bitumen composition, the modified Lottman test was carried out according to AASHTO T 283 to assess the resistance of the compacted compositions to moisture-induced damage. Results of this test are reported in Table 3.

TABLE 3

Modified Lottman Test (AASHTO T 283)

| | Dry Subset | | | | Wet Subset | | | |
|---|---|---|---|---|---|---|---|---|
| | 1 | 2 | 3 | Avg. | 1 | 2 | 3 | Avg. |
| BC Comparative Example A | | | | | | | | |
| Air Voids (%) | 7.3 | 7.0 | 6.6 | 7.0 | 7.0 | 7.3 | 6.8 | 7.0 |
| Moisture Saturation (%) | — | — | — | — | 73.4 | 70.2 | 70.8 | 71.5 |
| Tensile Strength (psi) | 117.6 | 114.5 | 117.7 | 116.6 | 116.1 | 106.3 | 113.2 | 111.9 |
| Avg. Tens. Stgth. Ratio | | | | 96 | | | | |
| BC Comparative Example B | | | | | | | | |
| Air Voids (%) | 6.6 | 6.8 | 6.9 | 6.8 | 6.7 | 6.9 | 6.7 | 6.8 |
| Moisture Saturation (%) | — | — | — | — | 71.5 | 74.4 | 70.9 | 72.3 |
| Tensile Strength (psi) | 126.2 | 122.8 | 128.5 | 125.8 | 55.5 | 45.0 | 55.0 | 51.8 |
| Avg. Tens. Stgth. Ratio | | | | 41 | | | | |
| BC Example 1 | | | | | | | | |
| Air Voids (%) | 7.1 | 7.4 | 6.9 | 7.1 | 7.4 | 6.7 | 7.2 | 7.1 |
| Moisture Saturation (%) | — | — | — | — | 72.5 | 70.1 | 71.2 | 71.3 |
| Tensile Strength (psi) | 114.5 | 110.7 | 110.6 | 111.9 | 104.8 | 113.5 | 106.6 | 108.3 |
| Avg. Tens. Stgth. Ratio | | | | 97 | | | | |
| BC Example 2 | | | | | | | | |
| Air Voids (%) | 7.0 | 6.9 | 6.5 | .8 | 6.5 | 7.0 | 7.1 | 6.9 |
| Moisture Saturation (%) | — | — | — | — | 74.9 | 72.5 | 71.0 | 72.8 |

TABLE 3-continued

Modified Lottman Test (AASHTO T 283)

| | Dry Subset | | | | Wet Subset | | | |
|---|---|---|---|---|---|---|---|---|
| | 1 | 2 | 3 | Avg. | 1 | 2 | 3 | Avg. |
| Tensile Strength (psi) | 104.3 | 112.0 | 123.3 | 113.2 | 116.2 | 110.2 | 111.3 | 1112.6 |
| Avg. Tens. Stgth. Ratio | | | | 96 | | | | |
| BC Example 3 | | | | | | | | |
| Air Voids (%) | 7.5 | 6.8 | 6.5 | 6.9 | 7.0 | 6.8 | 7.1 | 7.0 |
| Moisture Saturation (%) | — | — | — | — | 70.7 | 71.7 | 70.2 | 70.9 |
| Tensile Strength (psi) | 104.3 | 112.0 | 123.3 | 113.2 | 111.6 | 107.4 | 114.7 | 111.2 |
| Avg. Tens. Stgth. Ratio | | | | 98 | | | | |
| BC Example 4 | | | | | | | | |
| Air Voids (%) | 7.5 | 7.1 | 7.0 | 7.1 | 7.0 | 7.1 | 7.1 | 7.1 |
| Moisture Saturation (%) | — | — | — | — | 71.7 | 73.1 | 74.3 | 73.0 |
| Tensile Strength (psi) | 110.1 | 108.7 | 108.7 | 109.2 | 111.5 | 109.9 | 107.1 | 109.5 |
| Avg. Tens. Stgth. Ratio | | | | 100 | | | | |

Summary of All Samples

| | Average Tensile Strength Ratio | Ranking |
|---|---|---|
| BC Comp. Ex. A | 94 | 4 |
| BC Comp. Ex. B | 41 | 5 |
| BC Ex. 1 | 97 | 3 |
| BC Ex. 2 | 96 | 4 |
| BC Ex. 3 | 98 | 2 |
| BC Ex. 4 | 100 | 1 |

The results of the modified Lottman test indicate that all four exemplary bitumen compositions exhibited good resistance to moisture-induced damage. As shown above, each of BC Exs. 1-4 demonstrated much higher tensile strength ratios than that BC Comp. Exs. A-B. BC Comparative Example B, which is a conventional asphalt concrete composition having no antistripping additive, exhibited extreme susceptibility to moisture-induced damage, which is typical of asphalt concrete compositions without any modification. Each of BC Examples 1-4, which include antistripping compositions according to the present disclosure, exhibited much better adhesion than BC Comparative Example B. In addition, each of Examples 1-4 exhibited as good as and better resistance than BC Comparative Example A, which includes a conventional antistripping additive.

For each exemplary bitumen composition, the Hamburg wheel tracking test was carried out according to AASHTO T 324 to assess susceptibility of each composition to moisture-induced damage under load. In the Hamburg wheel tracking test, a rut depth of 25 mm or greater was considered failure, and the test for each sample was carried out at 50° C. Results of this test are reported in Table 4.

TABLE 4

Hamburg wheel tracking test (AASHTO T 324)

| | BC Comparative Example A | | | | BC Comparative Example B | | | |
|---|---|---|---|---|---|---|---|---|
| | 1 | | 2 | | 1 | | 2 | |
| | Core 1 | Core 2 | Core 3 | Core 4 | Core 1 | Core 2 | Core 3 | Core 4 |
| Air Voids (%) | 7.1 | 6.7 | 7.1 | 7.0 | 7.1 | 6.9 | 6.8 | 7.1 |
| Passes to Failure | >20,000 | | >20,000 | | >20,000 | | >20,000 | |
| Max. Rut Depth (mm) | 3.81 | | 3.65 | | 7.66 | | 6.48 | |
| Passes at Infl. Pt. | >20,000 | | >20,000 | | 14,374 | | 15,181 | |

| | BC Example 1 | | | | BC Example 2 | | | |
|---|---|---|---|---|---|---|---|---|
| | 1 | | 2 | | 1 | | 2 | |
| | Core 1 | Core 2 | Core 3 | Core 4 | Core 1 | Core 2 | Core 3 | Core 4 |
| Air Voids (%) | 6.7 | 7.1 | 7.3 | 6.5 | 6.5 | 7.0 | 6.6 | 6.6 |
| Passes to Failure | >20,000 | | >20,000 | | >20,000 | | >20,000 | |

TABLE 4-continued

| Hamburg wheel tracking test (AASHTO T 324) | | | | |
|---|---|---|---|---|
| Max. Rut Depth (mm) | 4.19 | 3.55 | 4.31 | 3.77 |
| Passes at Infl. Pt. | >20,000 | >20,000 | >20,000 | >20,000 |

| | BC Example 3 | | | | BC Example 4 | | | |
|---|---|---|---|---|---|---|---|---|
| | 1 | | 2 | | 1 | | 2 | |
| | Core 1 | Core 2 | Core 3 | Core 4 | Core 1 | Core 2 | Core 3 | Core 4 |
| Air Voids (%) | 7.2 | 6.2 | 6.6 | 6.8 | 6.6 | 7.1 | 6.8 | 6.8 |
| Passes to Failure | >20,000 | | >20,000 | | >20,000 | | >20,000 | |
| Max. Rut Depth (mm) | 4.29 | | 3.99 | | 4.01 | | 3.75 | |
| Passes at Infl. Pt. | >20,000 | | >20,000 | | >20,000 | | >20,000 | |

| Summary of All Samples | | |
|---|---|---|
| | Avg. Rut Depth (mm) | Ranking |
| BC Comp. Ex. A | 3.73 | 1 |
| BC Comp. Ex. B | 7.07 | 6 |
| BC Ex. 1 | 3.87 | 2 |
| BC Ex. 2 | 4.04 | 4 |
| BC Ex. 3 | 4.14 | 5 |
| BC Ex. 4 | 3.88 | 3 |

The results of the Hamburg wheel tracking test indicate that all four exemplary bitumen compositions exhibited reduced susceptibility of each composition to moisture-induced damage under load. As shown above, each of BC Exs. 1-4 demonstrated low average rut depths, indicating resistance to moisture-induced damage. BC Comparative Example B, which is a conventional asphalt concrete composition having no antistripping additive, exhibited extreme susceptibility to moisture-induced damage, which is typical of asphalt concrete compositions without any modification. In fact, the BC Comparative Example B was the only sample tested that reached an inflection point between the creep slope and the strip slope within 20,000 passes. Each of BC Examples 1-4, which include antistripping compositions according to the present disclosure, exhibited much better adhesion than BC Comparative Example B. Each of BC Examples 1-4 also exhibited similar resistance to moisture susceptibility to BC Comparative Example A, which includes a conventional antistripping additive. In particular, the maximum rut depth of seen in some tests of BC Examples 1-4 exceeded those seen for BC Comparative Example A, but the average maximum rut depth of the samples was similar.

In sum, these results indicate that antistripping compositions described herein are useful in reducing and/or preventing moisture damage in bitumen compositions (such as asphalt concrete) and suggest that further improvements may be achieved by considering other dosages of the antistripping composition in the bitumen composition.

BC Ex. 7 and BC Comp. Exs. C-E were prepared as discussed above. 0.5 wt % and 3.0 wt % of the antistripping compositions were added to the asphalt. BC Ex. 7 employed an antistripping composition comprising less than 80 wt % BHMT (less than pure BHMT) along with other synergistic nitrogen-containing compounds (not triamines or the disclosed nitriles). BC Comp. Ex. C comprised performance grade asphalt without antistripping composition (similar to BC Comp. Ex. B. BC Comp. Exs. D and E comprised asphalt along with a (linear) diamine additive (DAM-950 and Hexatran 200 from Ascend Performance Materials). The examples were aged in a pressure aging vessel (PAV) for 20, 40, and 60 days, and then tested for carbonyl index, BBR stiffness, and BBR M value. The results are shown in FIGS. 1A-C, 2A-C, and 3A-C.

Figure 1A:
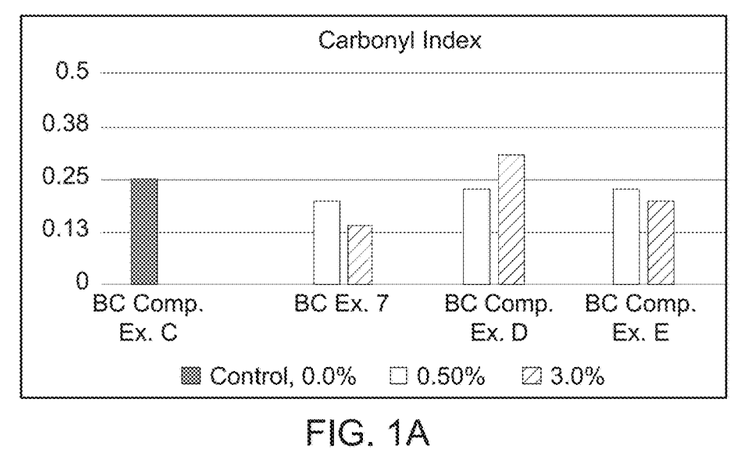
FIGS. 1A-C are graphs showing carbonyl index performance of a bitumen composition of one embodiment of the disclosure.
Figure 1B:
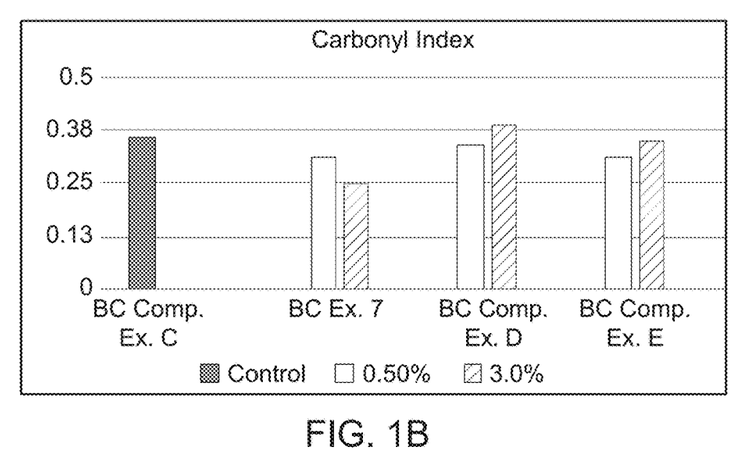
Figure 1C:
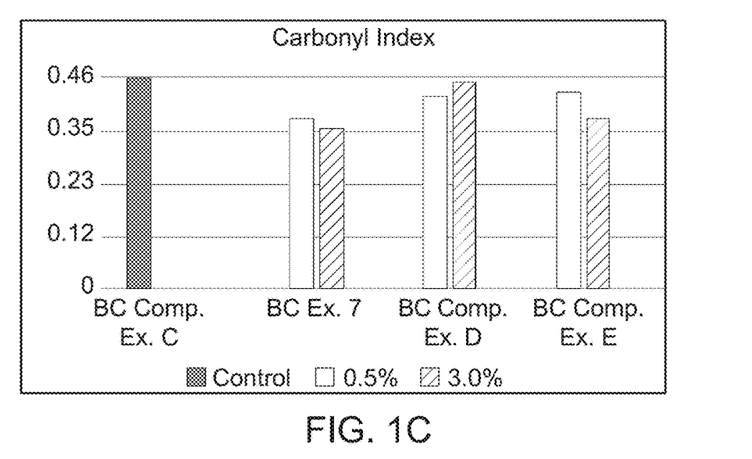

As shown in FIGS. 1A-C, the antistripping composition used in BC Ex. 7 significantly outperformed both the control BC Comp. Ex. C and the conventional additives, BC Comp. Exs D and E. As one example of the unexpected improvements, in terms of carbonyl index reduction, at $PAV_{60}$, Ex. 7 demonstrated carbonyl index values of 0.37/0.35 for 0.5 wt % and 3.0 wt %, respectively. In contrast, BC Comp. Ex. C (without antistripping composition) demonstrated carbonyl index of 0.46. And BC Comp. Exs. D and E demonstrated values of 0.42/0.45 and 0.43/0.37 for 0.5 wt % and 3.0 wt %, respectively.

Figure 2A:
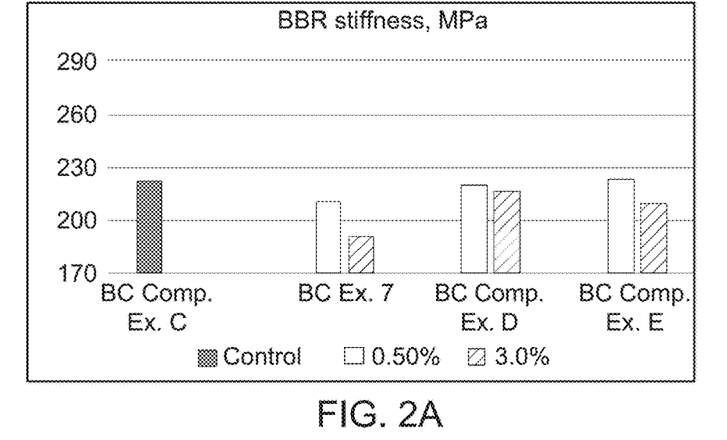
FIGS. 2A-C are graphs showing BBR stiffness performance of a bitumen composition of one embodiment of the disclosure.
Figure 2B:
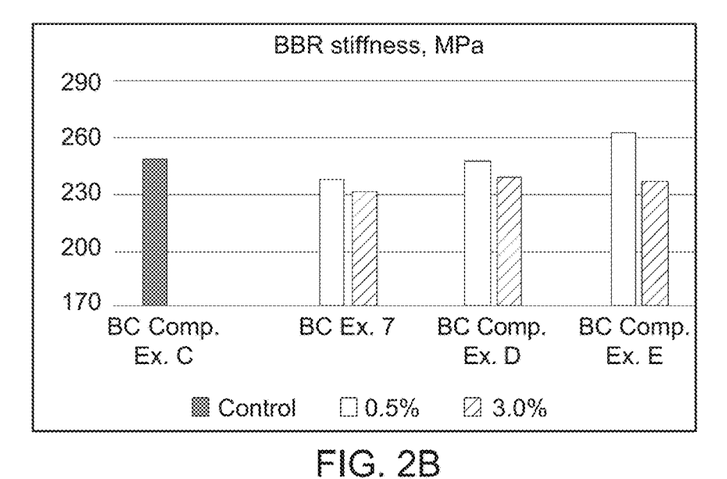
Figure 2C:
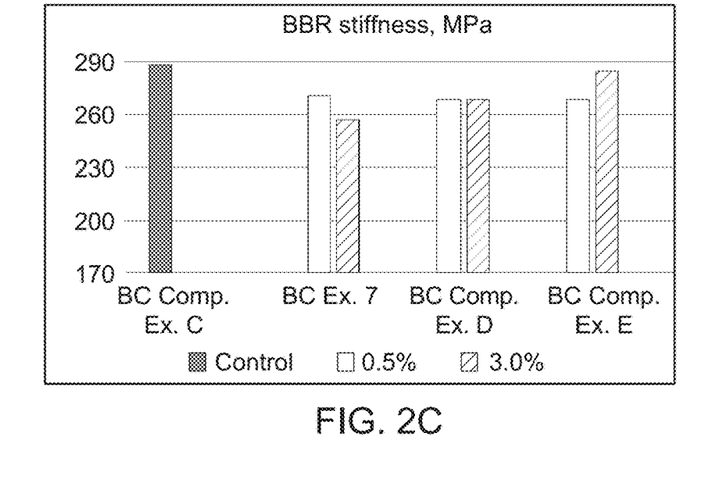

In terms of BBR stiffness, as shown in FIGS. 2A-C, the antistripping composition used in BC Ex. 7 significantly outperformed Comp. Exs. C-E in terms of BBR stiffness. As one example of the unexpected improvements, at $PAV_{40}$, Ex. 7 demonstrated BBR stiffness of 238/231 MPa for 0.5 wt % and 3.0 wt %, respectively. In contrast, BC Comp. Ex. C (without antistripping composition) demonstrated BBR stiffness of 248 MPa. And BC Comp. Exs. D and E demonstrated BBR stiffnesses of 247/239 MPa and 262/237 MPa for 0.5 wt % and 3.0 wt %, respectively.

Figure 3A:
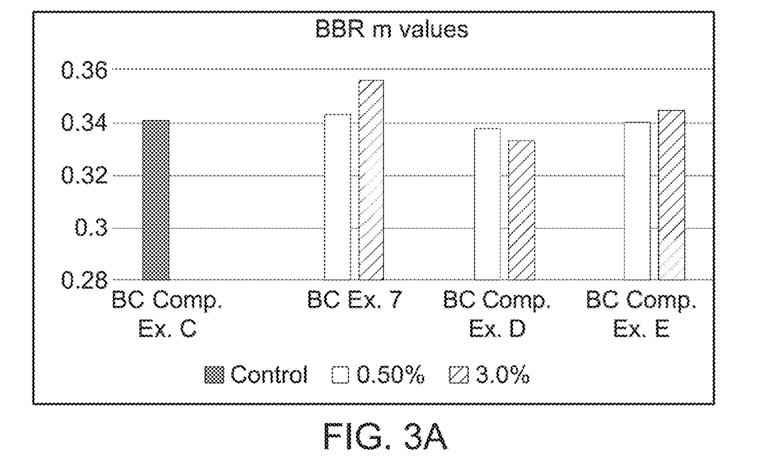
FIGS. 3A-C are graphs showing BBR M value performance of a bitumen composition of one embodiment of the disclosure.
Figure 3B:
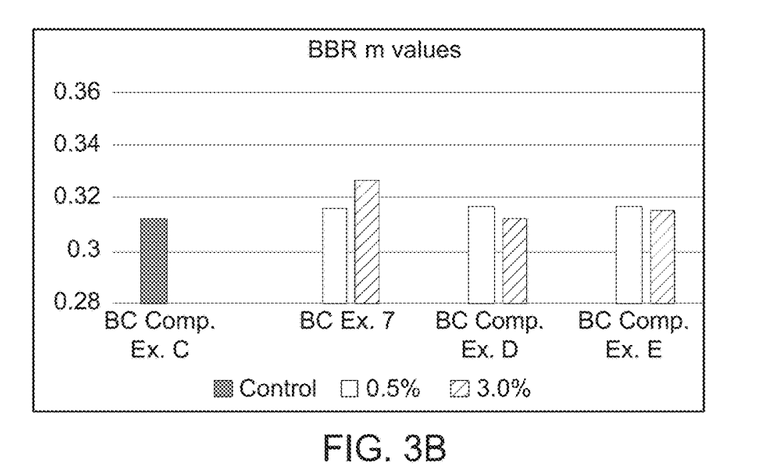
Figure 3C:
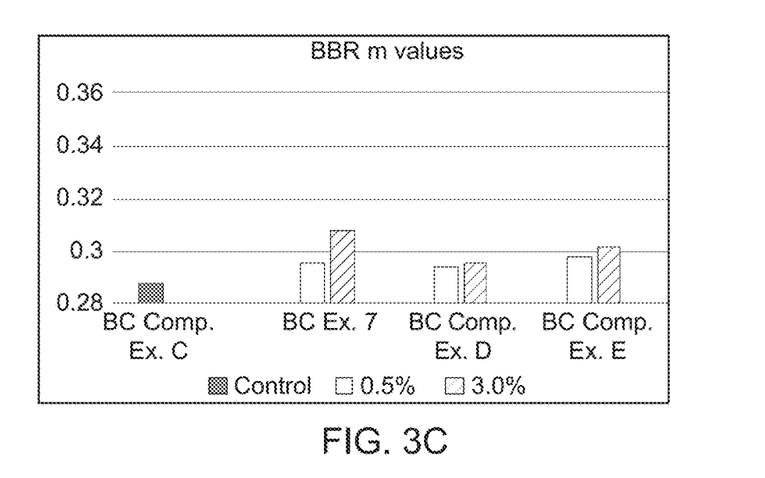

In terms of BBR M value, as shown in FIGS. 3A-C, the antistripping composition used in BC Ex. 7 significantly outperformed Comp. Exs. C-E in terms of BBR M value. As one example of the unexpected improvements, at $PAV_{60}$, Ex. 7 demonstrated BBR M value of 0.296/0.308 for 0.5 wt % and 3.0 wt %, respectively. In contrast, BC Comp. Ex. C (without antistripping composition) demonstrated BBR M value of 0.288. And BC Comp. Exs. D and E demonstrated BBR M values of 0.294/0.296 and 0.298/0.302 for 0.5 wt % and 3.0 wt %, respectively.

These results show that antistripping compositions that comprise the disclosed triamines, optionally along with synergistic additives (the nitrogen-containing compounds and/or nitriles disclosed herein) perform better than conventional amines, e.g., diamines.

EMBODIMENTS

As used below, any reference to a series of embodiments is to be understood as a reference to each of those embodi- ments disjunctively, e.g., "Embodiments 1-4" is to be understood as "Embodiments 1, 2, 3, or 4").

Embodiment 1 is an antistripping composition, comprising a triamine component, preferably present in an amount ranging from 1 wt % to 40 wt %.; and a nitrile component, preferably present in an amount ranging from 60 wt % to 99 wt %.

Embodiment 2 is the antistripping composition of any of the preceding or following embodiments, wherein the nitrile component has a chemical formula $C_xH_{2x-1}(CN)_3$, wherein x is from 4 to 10.

Embodiment 3 is the antistripping composition of any of the preceding or following embodiments, wherein the nitrile component comprises tricyanohexane.

Embodiment 4 is the antistripping composition of any of the preceding or following embodiments, wherein the nitrile component comprises a trinitrile compound having a chemical structure:

wherein a, b, and c are independently from 0 to 4.

Embodiment 5 is the antistripping composition of any of the preceding or following embodiments, wherein the nitrile component comprises adiponitrile.

Embodiment 6 is the antistripping composition of any of the preceding or following embodiments, wherein the triamine component comprises a triamine compound having a chemical structure:

wherein x and y are independently from 1 to 10, and wherein R is hydrogen, a C1-C5 alkyl group, a C2-C5 alkenyl group, or a C1-C5 alcohol group or wherein the triamine component comprise a triamine compound comprising BHMT, an ethyleneamine, or an amidoamine, or combinations thereof.

Embodiment 7 is the antistripping composition of any of the preceding or following embodiments, further comprising an organic additive.

Embodiment 8 is the antistripping composition of embodiment(s) 7, wherein the organic additive comprises a vegetable oil or wherein the organic additive comprises ethanol, propanol, or an alkylene glycol, or corresponding esters of thereof, or combinations thereof.

Embodiment 9 is the antistripping composition of embodiment(s) 8, wherein the vegetable oil is selected from the group consisting of canola oil, castor oil, coconut oil, corn oil, cottonseed oil, distilled tall oil, flax seed oil, jetropa oil, linseed oil, mustard oil, olive oil, palm oil, peanut oil, rapeseed oil, safflower oil, sesame oil, sunflower oil, soybean oil, soy oil (biodiesel), castor oil, tung oil, tigernut oil, and combinations thereof.

Embodiment 10 is the antistripping composition of any of embodiment(s) 7-9, wherein the organic additive comprises an ester having a chemical structure wherein a and b are independently from 0 to 4.

Embodiment 11 is the antistripping composition of any of the preceding or following embodiments, wherein the antistripping composition has an amine value from 5 mg KOH/g to 20 mg KOH/g.

Embodiment 12 is the antistripping composition of any of the preceding or following embodiments, wherein the antistripping composition comprises from 60 wt. % to 80 wt. % of the triamine component and from 1 wt. % to 40 wt. % of the nitrile component.

Embodiment 13 is the antistripping composition of any of the preceding or following embodiments, wherein the antistripping composition comprises less than 100 ppm water.

Embodiment 14 is a bitumen composition, comprising a bituminous material; and the antistripping composition of any of the preceding embodiments.

Embodiment 15 is the bitumen composition of embodiment(s) 14, wherein the bitumen composition comprises from 0.05 wt. % to 2 wt. % of the antistripping composition.

Embodiment 16 is the bitumen composition of embodiment(s) 14-15, wherein the bitumen composition comprises an asphalt.

Embodiment 17 is the bitumen composition of embodiment(s) 16, wherein the asphalt is performance-grade asphalt.

Embodiment 18 is the bitumen composition of any of embodiment(s) 15-17, wherein the bitumen composition exhibits at least 60% coating retention, measured according to ASTM D 3625.

Embodiment 19 is the bitumen composition of any of embodiment(s) 15-18, wherein the bitumen composition exhibits a tensile strength ratio greater than 80, measured according to AASHTO T 283.

Embodiment 20 is the bitumen composition of any of embodiment(s) 15-19, wherein the bitumen composition exhibits a Hamburg wheel track testing rut depth of less than 10 mm, measured according to AASHTO T 324.

Embodiment 21 is an antistripping composition, comprising: less than 95% of a triamine component; and greater than 5% nitrogen-containing compound other than the triamine component, and optionally water.

Embodiment 22 is a process for improving durability in a bitumen composition comprising a bituminous material, the process comprising adding the antistripping composition of any of the above claims to the bitumen composition to form a treated bitumen composition, wherein, upon aging for 40 days, the treated bitumen composition demonstrates a BBR stiffness less than 247 MPa, as measured in accordance with AASHTO T313 (current year).

We claim:
1. An antistripping composition, comprising:
   a triamine component; and
   a nitrile component;
   wherein the nitrile component has a chemical formula $C_xH_{2x-1}(CN)_3$, Wherein x is from 4 to 10.
2. The antistripping composition of claim 1, wherein the nitrile component comprises tricyanohexane.
3. The antistripping composition of claim 1, wherein the nitrile component comprises a trinitrile compound having a chemical structure:

wherein a, b, and c are independently from 0 to 4.

4. The antistrippping composition of claim 1, wherein the nitrile is present in an amount ranging from 1 wt % to 40 wt %.

5. The antistripping composition of claim 1, wherein the triamine is present in an amount ranging from 60 wt % to 99 wt %.

6. The antistripping composition of claim 1, wherein the triamine component comprises a triamine compound having a chemical structure:

wherein x and y are independently from 1 to 10, and wherein R is hydrogen, a $C_1$-$C_5$ alkyl group, a $C_2$-$C_5$ alkenyl group, or a $C_1$-$C_5$ alcohol group.

7. The antistripping composition of claim 1, wherein the triamine component comprise a triamine compound comprising bis (hexamethylene)triamine (BHMT), an ethyleneamine, or an amidoamine, or combinations thereof.

8. The antistripping composition of claim 1, further comprising an organic additive.

9. The antistripping composition of claim 8, wherein the organic additive comprises an ester having a chemical structure:

wherein a and b are independently from 0 to 4.

10. The antistripping composition of claim 8, wherein the organic additive comprises ethanol, propanol, or an alkylene glycol, or corresponding esters of thereof, or combinations thereof.

11. An antistripping composition, comprising:
from 60 wt % to 99 wt % of a triamine component comprising bis (hexamethylene) triamine (BHMT), an ethyleneamine, or an amidoamine, or combinations thereof;
from 1 wt. % to 20 wt. % of a nitrile component comprising tricyanohexane (TCH), or adiponitrile (ADN), or a combination thereof;
from 2 wt. % to 20 wt. % of an organic additive comprising ethanol, propanol, or an alkylene glycol, or corresponding esters of thereof, or combinations thereof.

12. A bitumen composition, comprising:
a bituminous material; and
the antistripping composition of claim 1;
wherein the bitumen composition comprises from 0.1 wt. % to 5 wt. % of the antistripping composition.

13. The bitumen composition of claim 12, wherein the bitumen composition exhibits at least 60% coating retention, measured according to ASTM D 3625 (2020) and/or a tensile strength ratio greater than 80, measured according to AASHTO T 283 (2020).

14. The bitumen composition of claim 12, wherein the bitumen composition exhibits a Hamburg wheel track testing rut depth of less than 10 mm, measured according to AASHTO T 324 (2020).

15. A process for improving durability in a bitumen composition comprising a bituminous material, the process comprising:
adding the antistripping composition of claim 1 to the bitumen composition to form a treated bitumen composition,
wherein, upon aging for 40 days, the treated bitumen composition demonstrates a BBR stiffness less than 247 MPa, as measured in accordance with AASHTO T313 (2020).

16. An antistripping composition, comprising:
a triamine component; and
a nitrile component;
wherein the nitrile component comprises a trinitrile compound having a chemical wherein a, b, and c are independently from 0 to 4.

17. The antistripping composition of claim 16, wherein the nitrile component comprises tricyanohexane.

18. The antistripping composition of claim 16, wherein the triamine is present in an amount ranging from 60 wt % to 99 wt %.

19. The antistripping composition of claim 16, further comprising an organic additive comprising ethanol, propanol, or an alkylene glycol, or corresponding esters of thereof, an ester having a chemical structure:

wherein a and b are independently from 0 to 4, or combinations thereof.

20. An antistripping composition, comprising:
a triamine component; and
a nitrile component;
wherein the triamine is present in an amount ranging from 60 wt % to 99 wt %.

21. The antistripping composition of claim 20, wherein the nitrile component has a chemical formula $C_xH_{2x-1}(CN)_3$, Wherein x is from 4 to 10.

22. The antistripping composition of claim 20, wherein the nitrile component comprises tricyanohexane.

23. An antistripping composition, comprising:
a triamine component;
a nitrile component; and
an organic additive comprising an ester having a chemical structure:

wherein a and b are independently from 0 to 4.

24. The antistripping composition of claim 23, wherein the triamine is present in an amount ranging from 60 wt % to 99 wt %.

25. The antistripping composition of claim 23, wherein the nitrile component has a chemical formula $C_xH_{2x-1}(CN)_3$, wherein x is from 4 to 10.

26. The antistripping composition of claim 23, wherein the nitrile component comprises tricyanohexane.

27. An antistripping composition, comprising:
  a triamine component;
  a nitrile component; and
  an organic additive comprising ethanol, propanol, or an alkylene glycol, or corresponding esters of thereof, or combinations thereof.

28. The antistripping composition of claim 27, wherein the triamine is present in an amount ranging from 60 wt % to 99 wt %.

29. The antistripping composition of claim 27, wherein the nitrile component has a chemical formula $C_{xH2x-1}(CN)_3$, wherein x is from 4 to 10.

30. The antistripping composition of claim 27, wherein the nitrile component comprises tricyanohexane.

* * * * *